United States Patent
Charles et al.

(10) Patent No.: US 11,747,999 B1
(45) Date of Patent: Sep. 5, 2023

(54) AUTOMATED NON-DISRUPTIVE MIGRATION OF HOSTS TO AN AUTHENTICATED STORAGE ARRAY CONNECTION

(71) Applicant: Dell Products L.P., Hopkinton, MA (US)

(72) Inventors: Peniel Charles, Bangalore (IN); Owen Crowley, Carrigaline (IE); Manikandan Sethuraman, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/678,083

(22) Filed: Feb. 23, 2022

(51) Int. Cl.
  *G06F 3/06* (2006.01)
  *G06F 21/78* (2013.01)
  *G06F 21/31* (2013.01)

(52) U.S. Cl.
  CPC ............ *G06F 3/0622* (2013.01); *G06F 3/067* (2013.01); *G06F 3/0635* (2013.01); *G06F 3/0659* (2013.01); *G06F 21/31* (2013.01); *G06F 21/78* (2013.01)

(58) Field of Classification Search
  CPC .... G06F 3/0622; G06F 3/0635; G06F 3/0659; G06F 3/067; G06F 21/31; G06F 21/78
  See application file for complete search history.

(56) References Cited

U.S. PATENT DOCUMENTS

| | | | | |
|---|---|---|---|---|
| 10,757,093 | B1* | 8/2020 | Salinas | H04L 63/083 |
| 2013/0042310 | A1* | 2/2013 | Najafi | G06F 21/43 |
| | | | | 726/7 |
| 2014/0040991 | A1* | 2/2014 | Potonniee | H04L 63/06 |
| | | | | 726/4 |
| 2015/0089608 | A1* | 3/2015 | Nandyala | H04L 63/20 |
| | | | | 726/6 |
| 2018/0189784 | A1* | 7/2018 | Grabowski | G06Q 20/4014 |

(Continued)

OTHER PUBLICATIONS

Zhang, Chongjie, Ian Kelley, and Gabrielle Allen. "Grid portal solutions: a comparison of GridPortlets and OGCE." Concurrency and Computation: Practice and Experience 19.12 (2007): 1739-1748. (Year: 2007).*

(Continued)

*Primary Examiner* — Nicholas J Simonetti
(74) *Attorney, Agent, or Firm* — ANDERSON GORECKI LLP (57) ABSTRACT

A management appliance communicates with host servers and a storage array to determine per-path loading. Based on the loading, the management appliance selects a host server with an uncredentialed path for reconfiguration. Unique endpoint authentication credentials are sent from the management appliance to the selected host server and the storage array. The uncredentialed path is placed in standby mode and the selected host server and the storage array are updated with the unique endpoint authentication credentials, which are then used to reactivate the path with endpoint authentication. Tight coupling between the MPIO software management appliance, storage array, and MPIO drivers on the host servers enables reconfiguration to be automated and based on host server loading, storage array loading, and loading of uncredentialed paths.

20 Claims, 6 Drawing Sheets

(56) References Cited

U.S. PATENT DOCUMENTS

2018/0227315 A1* 8/2018 Taneja ................ H04L 63/1408
2018/0227976 A1* 8/2018 Dudda .................. H04W 76/15

OTHER PUBLICATIONS

Nagai, Shouhei, Takahiro Kaida, and Osamu Mizuno. "The group data access control method in content centric network." 2015 10th Asia-Pacific Symposium on Information and Telecommunication Technologies (APSITT). IEEE, 2015. (Year: 2015).*

* cited by examiner

AUTOMATED NON-DISRUPTIVE MIGRATION OF HOSTS TO AN AUTHENTICATED STORAGE ARRAY CONNECTION

TECHNICAL FIELD

The subject matter of this disclosure is generally related to automated, non-disruptive reconfiguration of servers and storage nodes to use endpoint authentication for improved security.

BACKGROUND

In a data center, high-capacity, multi-user data storage systems such as storage area networks (SANs) and storage arrays maintain storage objects that are contemporaneously accessed by clustered host servers. Endpoint authentication protocols such as the challenge handshake authentication protocol (CHAP) for internet small computer systems interface (iSCSI) and Diffie-Hellman hash-based message authentication code CHAP (DH-HMAC-CHAP) for non-volatile memory express (NVMe) over fabrics/internet protocol (IP) can be used to help keep the host servers and storage arrays secure. Nevertheless, many organizations have configured host servers and storage systems to operate without endpoint authentication. As the problem of malicious security breaches continues to grow, organizations need to reconfigure uncredentialed host servers and storage arrays to use endpoint authentication. Server and storage administrators can coordinate to manually reconfigure host servers and storage arrays to use endpoint authentication. However, the reconfiguration process is slow and error-prone. Moreover, the number of times that the reconfiguration process must be performed is problematic. According to standards such as section 9.2.1 of the iSCSI specification, each initiator-target path must be configured with unique authentication credentials. Each host server typically supports multiple paths to a storage array, and a single data center may include hundreds or thousands of uncredentialed host servers, so the number of required reconfigurations renders the manual migration task impractical.

SUMMARY

In accordance with some implementations, a method comprises automatically generating unique authentication credentials; selecting at least one host server from a plurality of host servers that access data maintained by a storage node; selecting at least one uncredentialed path between the selected host server and the storage node, wherein the at least one uncredentialed path is defined by one or more ports of the selected host server and the storage node; pausing data access on the selected path; providing the unique authentication credentials to the storage node and the selected host server; and using the unique authentication credentials with the selected path.

In accordance with some implementations, a non-transitory computer-readable storage medium stores instructions that are executed by a plurality of host servers and a storage node that maintains data that is accessed by the host servers via uncredentialed paths between ports of the host servers and ports of the storage node to perform a method comprising: automatically generating unique authentication credentials; selecting at least one of the host servers; selecting at least one uncredentialed path between the selected host server and the storage node; pausing data access on the selected path; providing the unique authentication credentials to the storage node and the selected host server; and using the unique authentication credentials with the selected path.

In accordance with some implementations, an apparatus comprises: a plurality of host servers; a storage node that maintains data that is accessed by the host servers via uncredentialed paths between ports of the host servers and ports of the storage node; and a management appliance configured to automatically generate unique authentication credentials, select at least one of the host servers, select at least one uncredentialed path between the selected host server and the storage node, prompt data access on the selected path to be paused, provide the unique authentication credentials to the storage node and the selected host server, and prompt the storage node and the selected host server to use the unique authentication credentials with the selected path.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
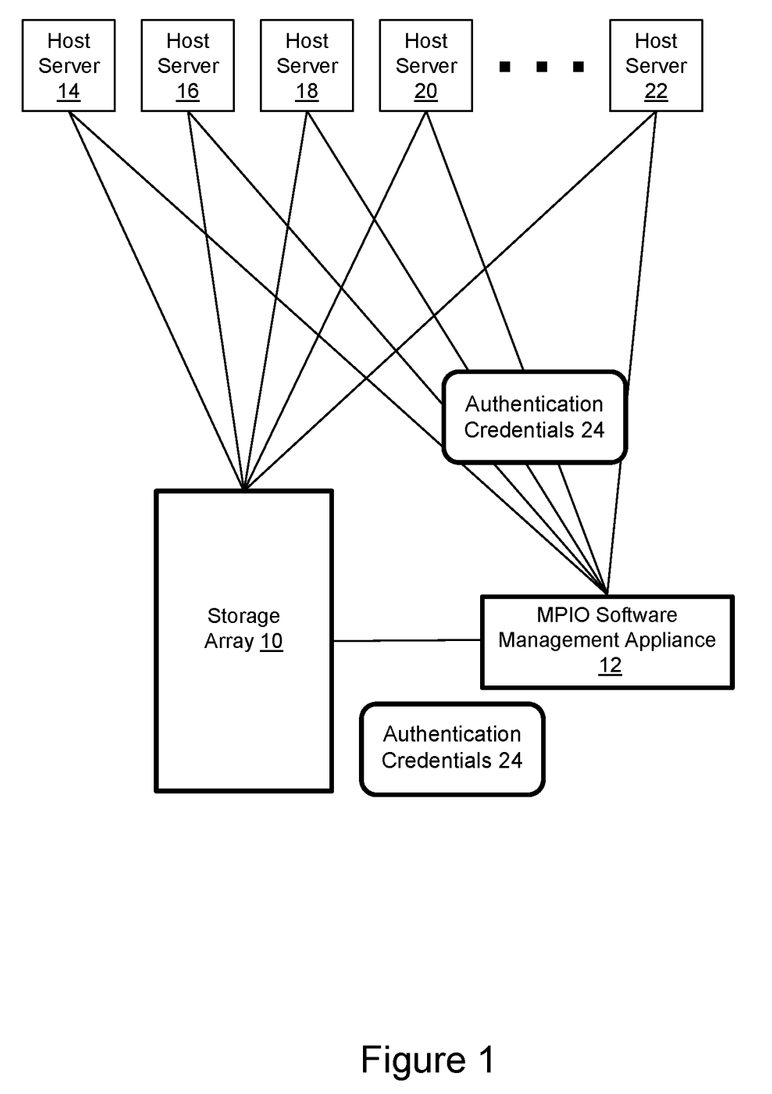
FIG. 1 illustrates automated, non-disruptive reconfiguration of host servers and a storage array to use endpoint authentication.

FIG. 1 illustrates automated, non-disruptive reconfiguration of host servers and a storage array to use endpoint authentication. Data centers often include multiple storage arrays and many host servers, but the simplified data center shown in FIG. 1 includes only a single storage array 10, a Multi-Path Input-Output (MPIO) software management appliance 12, and a cluster of host servers 14, 16, 18, 20, 22. The host servers 14, 16, 18, 20, 22 are initiators that send IO commands to the storage array 10. The storage array is the target of the IO commands. The MPIO software management appliance 12 manages distribution and implementation of authentication credentials 24 to reconfigure initiators and targets to use endpoint authentication. Initially, the host servers and the storage array are not configured to use endpoint authentication. The MPIO software management appliance may implement reconfiguration of individual initiator-target paths in a non-overlapping manner, i.e., one at a time, to reduce or eliminate disruption. The MPIO software management appliance communicates with the host servers and the storage array to determine whether current IO loading is light enough for reconfiguration of at least one initiator-target path. If the storage array and one or more of the host servers are loaded lightly enough to support reconfiguration, then the MPIO software management appliance selects the least heavily loaded initiator-target path of the least heavily loaded host server for reconfiguration. Unique authentication credentials 24 such as a CHAP username and CHAP secret for the initiator or both the initiator and target associated with the selected path are sent from the MPIO software management appliance to the initiator and the target. The path is then placed in standby mode and the initiator and target are reconfigured to use endpoint authentication. The endpoint authentication may be one-way, in which the target authenticates the initiator, or two-way, in which the target authenticates the initiator, and the initiator authenticates the target. Login and endpoint authentication then occurs, and the path is placed back into active mode. Because each initiator-target pair supports multiple paths, IOs continue to be sent and processed via active paths between an initiator-target pair while the path under reconfiguration is in standby mode. The process is automatically iterated until all initiator-target paths have been reconfigured to use endpoint authentication. Because the reconfiguration process is automated, it is faster, less prone to error, and more practical to perform than the manual reconfiguration process.

Figure 2:
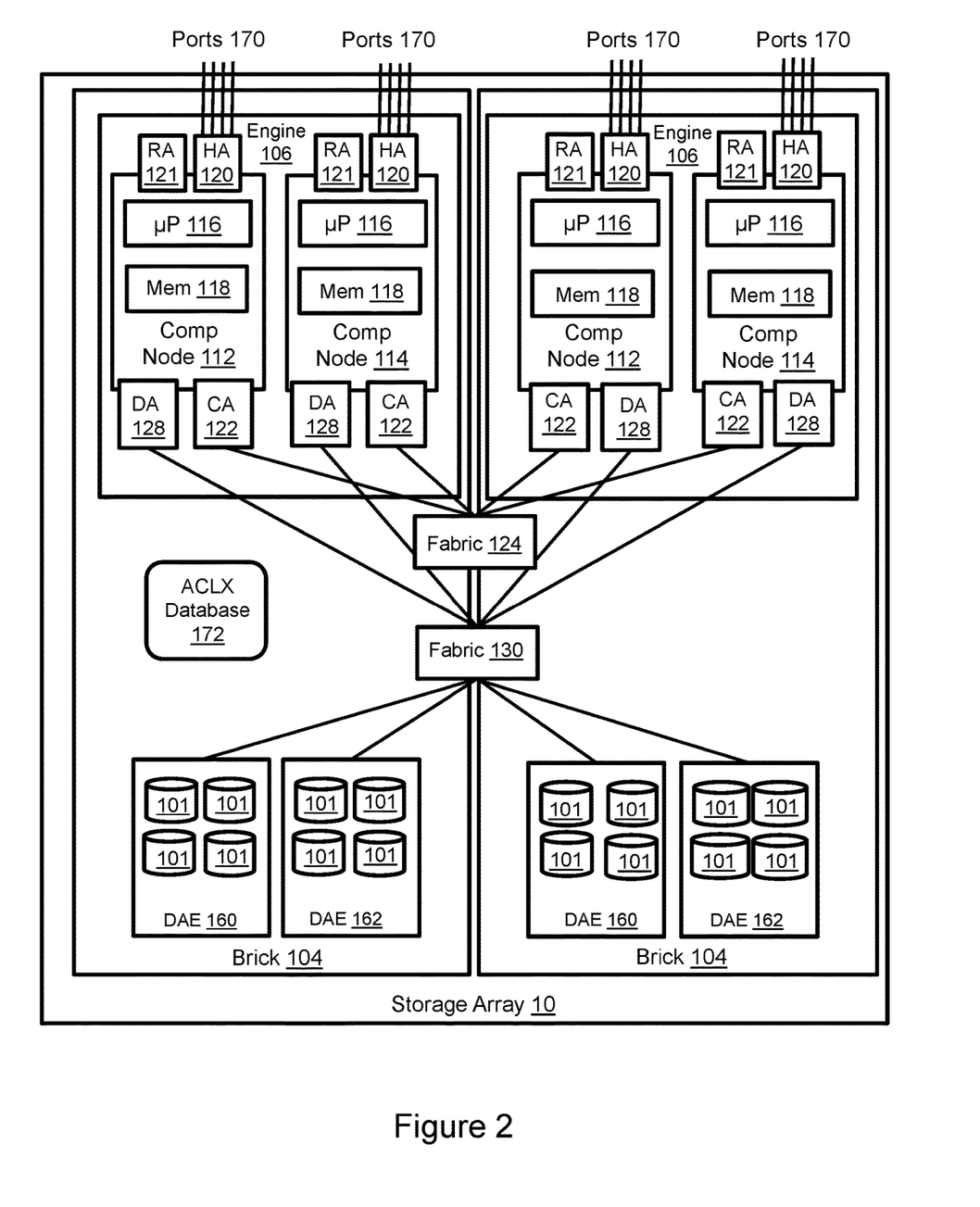
FIG. 2 illustrates the storage array in greater detail.

FIG. 2 illustrates the storage array 10 in greater detail. The storage array 10 includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the host servers from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has ports 170 for communicating with the host servers to service input-output commands (IOs) sent from the host servers. Each initiator-target port pair defines a path. Each host server may be connected to the storage array via multiple ones of the ports corresponding to different paths, which facilitates load balancing and reliability. The host adapter resources may include processors and volatile memory. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. An access control logix (ACLX) database 172 includes metadata that describes the paths supported by the storage array. For example, the host server names, port IDs associated with each port pair, and authentication credentials for all supported paths are included in the ACLX database, which may be persistently stored on the managed drives and copied into memory for low latency access during operation.

Figure 3:
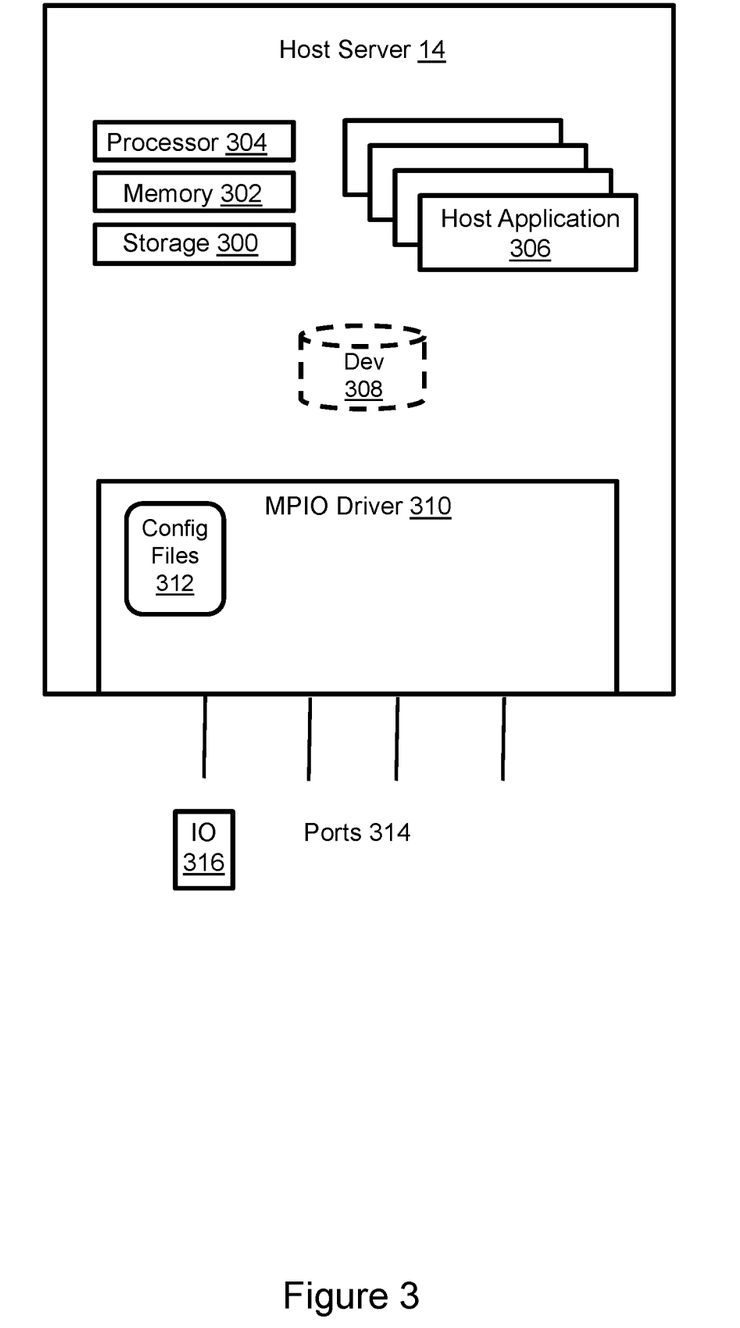
FIG. 3 illustrates one of the host servers in greater detail.

FIG. 3 illustrates host server 14 in greater detail. The host servers may be substantially identical. Host server 14 includes volatile memory 302, non-volatile storage 300, one or more tangible processors 304 that support instances 306 of a host application, ports 314, and an MPIO driver 310. Examples of host applications might include, but are not limited to, software for email, accounting, sales, inventory control, manufacturing, and a wide variety of other organizational functions. The MPIO driver 310 discovers a storage object that is maintained and presented by the storage array.

A corresponding logical host device 308 that is a representation of that storage object is generated locally for access by the host application instances. The instances of the host application use the logical host device for data access, e.g., to read and write host application data to logical addresses. Corresponding IOs 316 are generated and sent to the storage array via the MPIO driver 310 to access the storage object to read and write data. More specifically, the MPIO driver selects from among the multiple available paths between the host server and the storage array in order to balance IO loading. The IO is sent to the storage array via the port 314 corresponding to the selected path. Configuration files 312 maintained by the host server include metadata that describes the paths supported by the host server. For example, the ports IDs and authentication credentials for each supported path are included in the configuration files, which may be persistently stored in storage and copied into memory for low latency access during operation.

Figure 4:
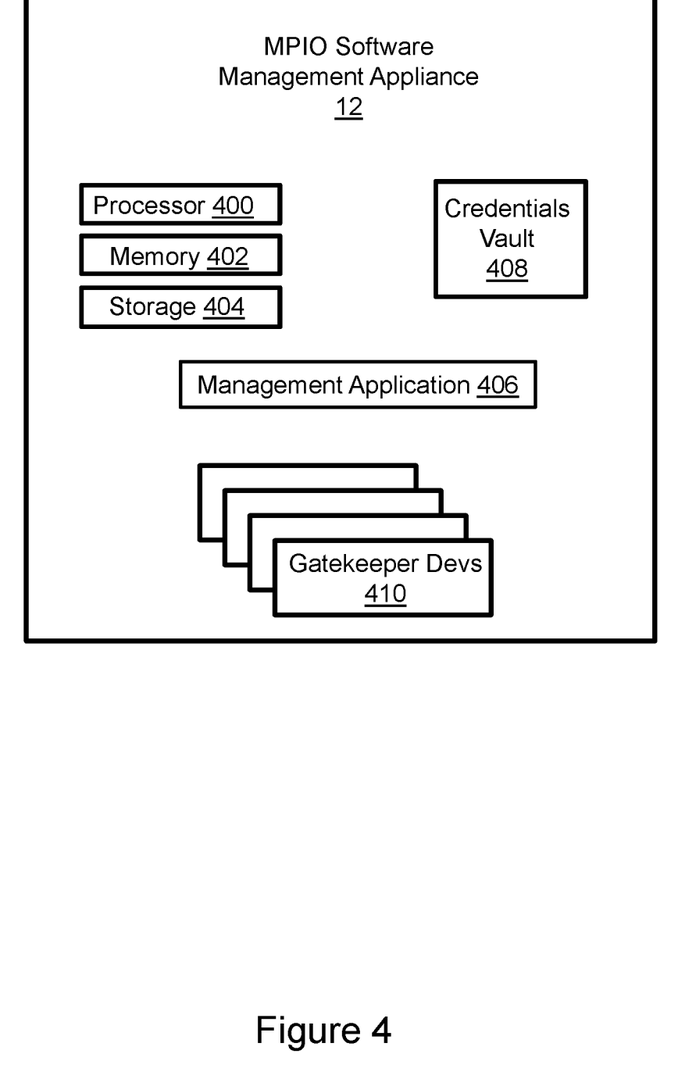
FIG. 4 illustrates the MPIO software management appliance in greater detail.

FIG. 4 illustrates the MPIO software management appliance 12 in greater detail. The MPIO software management appliance includes volatile memory 402, non-volatile storage 404, and one or more tangible processors 400 that run a management application 406. A credentials vault 408 contains the authentication credentials of all managed paths in encrypted form. Authentication credentials for the managed paths may be retrieved and decrypted as needed. The management application 406 generates unique authentication credentials for each managed path, communicates with the MPIO drivers and the storage array to determine current IO loading, selects paths for reconfiguration, and manages reconfiguration. Gatekeeper devices 410 facilitate system calls between the management application and the storage array and host servers in support of reconfiguration.

Figure 5:
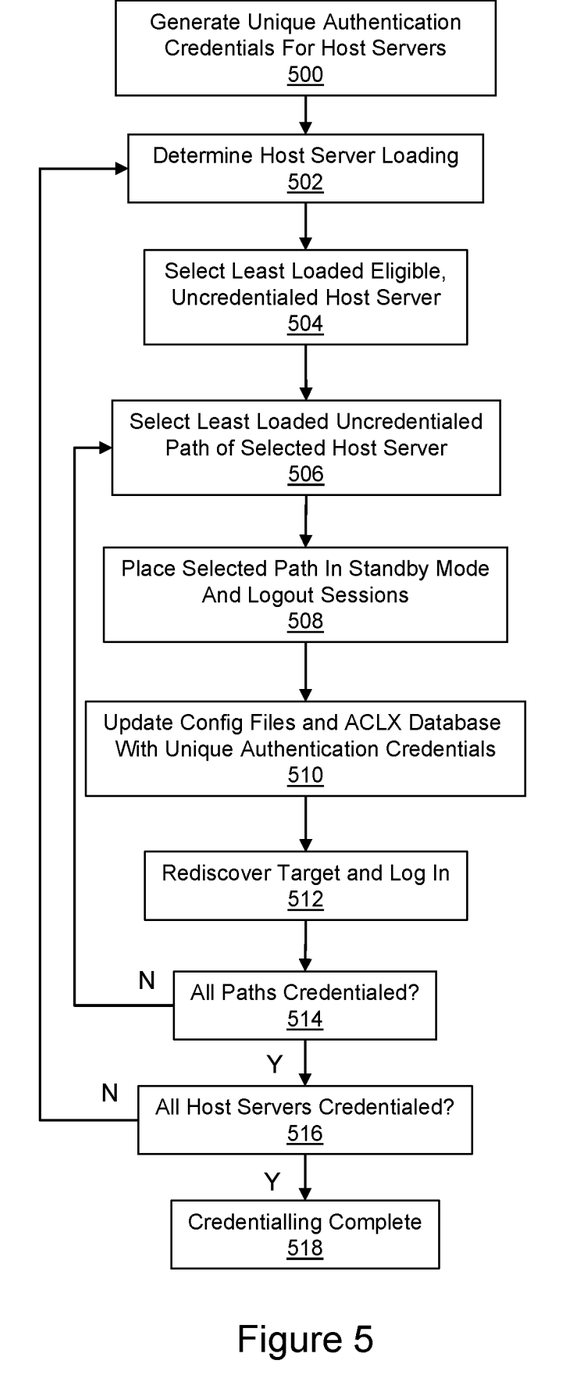
FIG. 5 illustrates a method for automated reconfiguration to use one-way authentication credentials.

FIG. 5 illustrates a method for automated reconfiguration to use one-way authentication credentials. Step 500 is generating unique authentication credentials for all uncredentialed host servers (host servers having at least one uncredentialed path). The management application running on the MPIO software management appliance may generate the authentication credentials, which may include a CHAP username and CHAP secret for each uncredentialed path. The CHAP username identifies the initiator (host server) and the CHAP secret is an arbitrary string. Step 502 is determining host server IO loading, including IO loading per path. The management application running on the MPIO software management appliance communicates with the MPIO drivers of all uncredentialed host servers via the gatekeeper devices to determine current IO loading. Step 504 is selecting the least loaded eligible, uncredentialed host server. Host servers that are too heavily loaded with IOs in the aggregate (all paths) are ineligible for reconfiguration. Host servers that are not too heavily loaded with IOs in the aggregate are considered eligible for reconfiguration. A predetermined threshold may be used to determine eligibility, e.g., based on average IOPS on all paths for a selected time period. Step 506 is selecting the least loaded uncredentialed path of the host server selected in step 504. Path IO loading may be based on average path IOPS for the selected time period. Step 508 is placing the selected path in standby mode and logging out associated sessions. New IOs are not placed in the path in standby mode and IOs that are currently in process are completed. Step 510 is updating the configuration files of the host server and the ACLX database of the storage array with the unique one-way endpoint authentication credentials of the path. The one-way endpoint authentication credentials of the path are communicated from the management application running on the MPIO software management appliance to the MPIO driver on the host server and also to one of the compute nodes of the storage array. Step 512 is rediscovering the target and logging in. The MPIO driver rediscovers the storage array and storage object. Endpoint authentication is performed using the unique one-way endpoint authentication credentials of the path, i.e., the target authenticates the initiator. If some paths supported by the selected host server are still uncredentialed, as determined in step 514, then flow returns to step 506. If all paths supported by the selected host server are credentialed, as determined in step 514, then flow continues to step 516. If some host servers still have uncredentialed paths, as determined in step 516, then flow returns to step 502. If all paths of all host servers are credentialed, as determined in step 516, then flow continues to step 518, and reconfiguration is complete.

Figure 6:
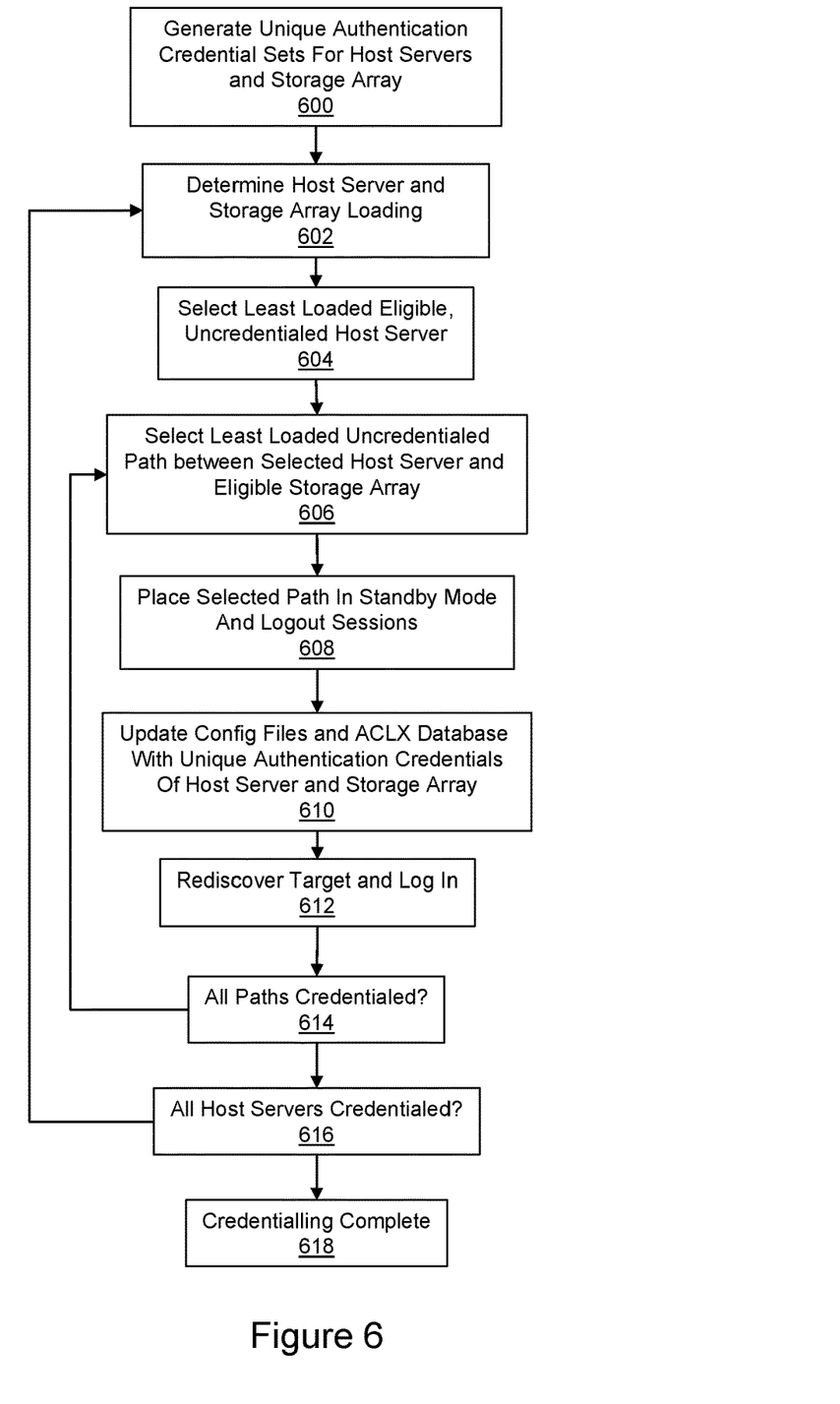
FIG. 6 illustrates a method for automated reconfiguration to use two-way authentication credentials.

FIG. 6 illustrates a method for automated reconfiguration to use two-way authentication credentials. Step 600 is generating unique authentication credentials for all uncredentialed host servers and storage arrays, i.e., host servers and storage arrays having at least one uncredentialed path. The management application running on the MPIO software management appliance may generate the authentication credentials, which may include a CHAP username and CHAP secret for each target and each initiator of each uncredentialed path. The CHAP usernames identify the initiator (host server) and the target (storage array), respectively, and the CHAP secrets are arbitrary strings. Step 602 is determining host server and storage array IO loading, including IO loading per path. The management application running on the MPIO software management appliance communicates with the storage array and the MPIO drivers of all uncredentialed host servers via the gatekeeper devices to determine current IO loading. Step 604 is selecting the least loaded eligible, uncredentialed host server. Host servers that are too heavily loaded with IOs in the aggregate (all paths) are ineligible for reconfiguration. Host servers that are not too heavily loaded with IOs in the aggregate are considered eligible for reconfiguration. A predetermined threshold may be used to determine eligibility, e.g., based on average IOPS on all paths for a selected time period. Step 606 is selecting the least loaded uncredentialed path between the host server selected in step 504 and an eligible storage array. Storage arrays that are too heavily loaded with IOs in the aggregate (all paths) are ineligible for reconfiguration. Storage arrays servers that are not too heavily loaded with IOs in the aggregate are considered eligible for reconfiguration. A predetermined threshold may be used to determine eligibility, e.g., based on average IOPS on all paths for a selected time period. Step 608 is placing the selected path in standby mode and logging out associated sessions. New IOs are not placed in the path in standby mode and IOs that are currently in process are completed. Step 610 is updating the configuration files of the host server and the ACLX database of the storage array with the unique two-way endpoint authentication credentials of the path. The two-way endpoint authentication credentials of the path are communicated from the management application running on the MPIO software management appliance to the MPIO driver on the host server and also to one of the compute nodes of the storage array. Step 612 is rediscovering the target and logging in. The MPIO driver rediscovers the storage array and storage object. Endpoint authentication is performed using the unique two-way endpoint authentication credentials of the path, i.e., the target authenticates the initiator, and the initiator authenticates the target. If some paths supported by the selected host server are still uncredentialed, as determined in step 614, then flow returns to step 606. If all paths supported by the selected host server are credentialed, as determined in step 614, then flow continues to step 616. If some host servers still have uncredentialed paths, as determined in step 616, then flow returns to step 602. If all paths of all host servers are credentialed, as determined in step 616, then flow continues to step 618, and reconfiguration is complete.

Although specific advantages should not be considered as limitations or necessary for implementation of the inventive concepts, at least some implementations may provide faster, more practical reconfiguration to use endpoint reconfiguration. Because large numbers of host servers and paths may require reconfiguration, automated credential generation, distribution, and implementation may be faster and less prone to error than manual reconfiguration. Moreover, disruption can be reduced or minimized by selectively reconfiguring host servers and storage arrays based on 10 loading and maintaining an active path between an initiator-target pair while reconfiguring a different path between the same initiator-target pair.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
    automatically generating unique authentication credentials;
    selecting at least one host server from a plurality of host servers that access data maintained by a storage node;
    selecting at least one uncredentialed path between the selected host server and the storage node, wherein the at least one uncredentialed path is defined by one or more ports of the selected host server and the storage node;
    pausing data access on the selected path;
    providing the unique authentication credentials to the storage node and the selected host server; and
    using the unique authentication credentials with the selected path.

2. The method of claim 1 further comprising defining a plurality of uncredentialed paths between the ports of the host servers and the ports of the storage node.

3. The method of claim 2 further comprising selecting the at least one of the host servers based on relative loading of all the host servers.

4. The method of claim 3 further comprising selecting the at least one uncredentialed path between the selected host server and the storage node based on relative loading of all uncredentialed paths between the selected host server and the storage node.

5. The method of claim 4 further comprising pausing data access on the selected path based on loading of the storage node.

6. The method of claim 5 further comprising generating unique one-way endpoint authentication credentials.

7. The method of claim 5 further comprising generating unique two-way endpoint authentication credentials.

8. The method of claim 1 further comprising the selected host server rediscovering the storage node.

9. A non-transitory computer-readable storage medium storing instructions that are executed by a plurality of host servers and a storage node that maintains data that is accessed by the host servers via uncredentialed paths between ports of the host servers and ports of the storage node to perform a method comprising:
    automatically generating unique authentication credentials;
    selecting at least one of the host servers;
    selecting at least one uncredentialed path between the selected host server and the storage node;
    pausing data access on the selected path;
    providing the unique authentication credentials to the storage node and the selected host server; and
    using the unique authentication credentials with the selected path.

10. The non-transitory computer-readable storage medium of claim 9 further comprising defining a plurality of uncredentialed paths between the ports of the host servers and the ports of the storage node.

11. The non-transitory computer-readable storage medium of claims 10 further comprising selecting the at least one of the host servers based on relative loading of all the host servers.

12. The non-transitory computer-readable storage medium of claim 11 further comprising selecting the at least one uncredentialed path between the selected host server and the storage node based on relative loading of all uncredentialed paths between the selected host server and the storage node.

13. The non-transitory computer-readable storage medium of claim 12 further comprising pausing data access on the selected path based on loading of the storage node.

14. An apparatus, comprising:
    a plurality of host servers;
    a storage node that maintains data that is accessed by the host servers via uncredentialed paths between ports of the host servers and ports of the storage node; and
    a management appliance configured to automatically generate unique authentication credentials, select at least one of the host servers, select at least one uncredentialed path between the selected host server and the storage node, prompt data access on the selected path to be paused, provide the unique authentication credentials to the storage node and the selected host server, and prompt the storage node and the selected host server to use the unique authentication credentials with the selected path.

15. The apparatus of claim 14 wherein the management appliance is further configured to select the at least one of the host servers based on relative loading of all the host servers.

16. The apparatus of claim 15 wherein the management appliance is further configured to select the at least one uncredentialed path between the selected host server and the storage node based on relative loading of all uncredentialed paths between the selected host server and the storage node.

17. The apparatus of claim 16 wherein the management appliance is further configured to prompt pausing data access on the selected path based on loading of the storage node.

18. The apparatus of claim 17 wherein the management appliance is further configured to generate unique one-way endpoint authentication credentials.

19. The apparatus of claim 17 wherein the management appliance is further configured to generate unique two-way endpoint authentication credentials.

20. The apparatus of claim 14 wherein the selected host server rediscovers the storage node.

\* \* \* \* \*